(12) United States Patent
Soni et al.

(10) Patent No.: US 8,595,668 B1
(45) Date of Patent: Nov. 26, 2013

(54) CIRCUITS AND METHODS FOR EFFICIENT CLOCK AND DATA DELAY CONFIGURATION FOR FASTER TIMING CLOSURE

(71) Applicant: LSI Corporation, Milpitas, CA (US)

(72) Inventors: Anuj Soni, Bangalore (IN); Vinaya Gudeangadi, Bangalore (IN)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/627,054

(22) Filed: Sep. 26, 2012

(51) Int. Cl.
  *G06F 17/50* (2006.01)
(52) U.S. Cl.
  USPC ........... 716/114; 716/108; 716/110; 716/111; 716/113
(58) Field of Classification Search
  USPC .................................................. 716/108–114
  See application file for complete search history.

(56) References Cited

U.S. PATENT DOCUMENTS

| 6,550,045 | B1 | 4/2003 | Lu et al. |
| 7,205,803 | B2 | 4/2007 | Chung et al. |
| 7,590,961 | B2 | 9/2009 | Gasper, Jr. et al. |
| 7,932,765 | B2 | 4/2011 | Kapusta et al. |
| 2001/0048333 | A1* | 12/2001 | Fujii .............................. 327/270 |
| 2004/0243957 | A1* | 12/2004 | Mandry ........................... 716/6 |

* cited by examiner

*Primary Examiner* — Nha Nguyen
(74) *Attorney, Agent, or Firm* — Ryan, Mason & Lewis, LLP

(57) ABSTRACT

Systems and methods are provided for designing integrated circuits using configurable delay cell (CDC) circuits that serve to expedite timing closure for an integrated circuit (IC) design by eliminating the need to iteratively repeat various design steps such as placement, signal distribution network synthesis, and routing. CDC circuits include footprint compatible circuits having different delay characteristics, which may be included as part of a standard cell library for designing integrated circuits. A CDC circuit can be used in an IC design to add a desired delay to a given clock path or data path, and then replaced with another footprint compatible CDC circuit to increase or decrease the delay in the given clock or data path to meet one or more timing requirements and achieve timing closure without having to repeat placement, signal distribution network synthesis or routing steps.

21 Claims, 6 Drawing Sheets

CIRCUITS AND METHODS FOR EFFICIENT CLOCK AND DATA DELAY CONFIGURATION FOR FASTER TIMING CLOSURE

BACKGROUND

In general, the design of digital integrated circuits includes two main design phases such as, for example, an RTL (register transfer level) design phase and a physical design phase. An RTL design phase is performed by converting a user specification of chip function into an RTL description, which specifies how each portion of the chip operates on each clock cycle. In the physical design phase, a chip design is generated using a corresponding RTL file and a library of standard component cells such as basic logic gates (AND gate, OR gates, NAND gates, NOR gates, etc.) and macro cells such as adders, multiplexers, flip-flops, memory, etc. More specifically, a physical design phase includes various phases such as logic synthesis, placement, clock-tree synthesis, and routing.

With present technologies, each of the physical design flow steps of logic synthesis, placement, clock-tree synthesis, and routing need to be timing-aware in order for a given design to properly meet specified timing constraints/requirements. Timing closure is a process by which a chip design is iteratively modified to meet specified timing constraints/requirements. Timing closure requires a balancing of data delays and clock delays with the given timing constraints/requirements. Typically, integrated circuit (IC) chip designers will attempt to close timing at all stages of the physical design process such as placement, clock tree synthesis, and routing. A chip designer may rely on changes in clock latency to close timing without disturbing data paths. For example, if the clock latency to a given macro cell is determined to be unacceptable, the chip designer must rebuild an associated clock-tree network. Once a clock-tree network is built, however, it is very challenging to change clock delays or data delays because any change that is made to the clock-tree network after the routing process is complete can affect other non-related paths. If the latencies are not correct, various design steps such as placement, clock tree synthesis, and routing must be repeatedly performed to meet the required timing constraints/requirements, which can be extremely time consuming and costly in terms of engineering hours.

SUMMARY

Embodiments of the invention include systems and methods for designing integrated circuits using configurable delay cell (CDC) circuits that serve to expedite timing closure for IC designs by eliminating the need to iteratively repeat various design steps such as placement, clock synthesis, and routing. CDC circuits according to embodiments are circuits having variable delays and footprint compatibility, which may be included as part of a standard cell library for designing integrated circuits. A CDC circuit can be used in an IC design to add a desired delay to a given clock path or data path, and then replaced with another footprint compatible CDC circuit to increase or decrease the delay in the given clock or data path to meet one or more timing requirements and achieve timing closure without having to repeat placement, signal distribution network synthesis or routing steps.

In another embodiment of the invention, an integrated circuit includes a first macro circuit block having an input pin, a second macro circuit block having an input pin, a first configurable delay circuit having an output connected to the input pin of the first macro circuit block, a second configurable delay circuit having an output connected to the input pin of the second macro circuit block, and a signal distribution network having an output connected to an input of at least the first configurable delay circuit. The first configurable delay circuit and the second configurable delay circuit have a same footprint, but have different delay characteristics.

Embodiments of the invention will be described or become apparent from the following detailed description of embodiments, which is to be read in connection with the accompanying drawings.

DETAILED DESCRIPTION

Embodiments of the invention will now be discussed in further detail below with regard to systems and methods for designing integrated circuits using CDC circuits that serve to expedite timing closure for IC design by eliminating the need to iteratively repeat various design steps such as placement, clock synthesis, and routing. CDC circuits according to embodiments are circuits having variable delays and footprint compatibility, which may be included as part of a standard cell library for designing integrated circuits. A CDC circuit can be used in an IC design to add a desired delay to a given clock path or data path, and then replaced with another footprint compatible CDC circuit to increase or decrease the delay in the given clock or data path to meet one or more timing requirements and achieve timing closure without having to repeat placement, clock synthesis or routing steps.

Figure 1:
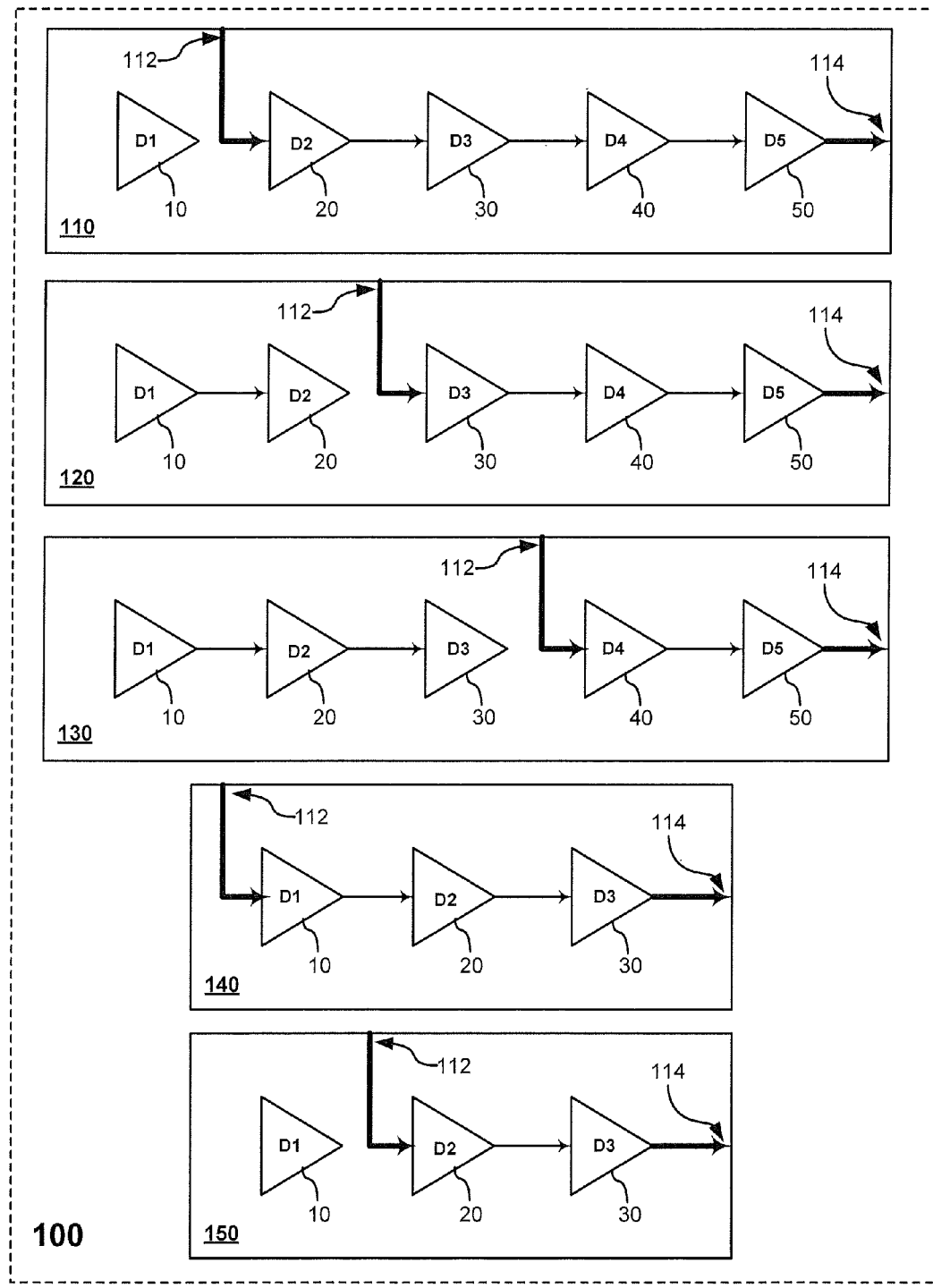
FIG. 1 shows an embodiment of a cell library having various CDC circuits for designing an integrated circuit.

FIG. 1 shows an embodiment of a cell library having various CDC circuits for designing an integrated circuit. FIG. 1 shows an embodiment of a cell library 100 having a plurality of CDC circuits 110, 120, 130, 140, and 150, wherein each CDC circuit comprises a chain of buffers that are serially connected between an input port 112 and an output port 114 to provide different delay characteristics for the CDC circuits 110, 120, 130, 140 and 150. A first CDC circuit 110, a second CDC circuit 120, and a third CDC circuit 130 each comprise five different buffers 10, 20, 30, 40, and 50 having delay values D1, D2, D3, D4, and D5, respectively. Moreover, a fourth CDC circuit 140 and fifth CDC circuit 150 each comprise three different buffers 10, 20 and 30 having delay values D1, D2, and D3, respectively.

A the first CDC circuit 110 comprises buffers 20, 30, 40 and 50 serially connected between the input port 112 and the output port 114 to provide a total delay of D2+D3+D4+D5. The second CDC circuit 120 comprises buffers 30, 40 and 50 serially connected between the input port 112 and the output port 114 to provide a total delay of D3+D4+D5. The third CDC circuit 140 comprises buffers 40 and 50 serially connected between the input port 112 and the output port 114 to provide a total delay of D4+D5. Moreover, the fourth CDC circuit 140 comprises buffers 10, 20, and 30 serially connected between the input port 112 and the output port 114 to provide a total delay of D1+D2+D3, and the fifth CDC circuit 150 comprises buffers 20 and 30 serially connected between the input port 112 and the output port 114 to provide a total delay of D2+D3.

In the embodiment of FIG. 1, the first, second and third CDC circuits 110, 120 and 130 provide a first set of footprint compatible CDC circuits in the library 100, which have the same footprint, but different delay characteristics. Moreover, the fourth and fifth CDC circuits 140 and 150 provide a second set of footprint compatible CDC circuits in the library 100, which has the same footprint, but different delay characteristics. The term "footprint" as used herein refers to a representation of the physical area (size and shape) that a given CDC circuit occupies in an IC design. While the CDC circuits 110, 120 and 130 have the same number of buffers to ensure footprint compatibility, none, or one or more the buffers D1, D2, D3, D4, and D5 may be left unconnected in a given CDC circuit to provide a first set of footprint compatible CDC circuits with different delay characteristics. Similarly, while the CDC circuits 140 and 150 have the same number of buffers to ensure footprint compatibility, none, or one or more the buffers D1, D2, and/or D3 may be left unconnected in a given CDC circuit to provide a second set of footprint compatible CDC circuits with different delay characteristics.

In this regard, as discussed in further detail below, any one of the CDC circuits 110, 120, or 130 in the first set of footprint compatible CDC circuits of the cell library 100 can be replaced with another footprint compatible CDC circuit, but which has a different delay characteristic to meet certain timing constraints without having to repeat design steps such as placement, routing, etc. Moreover, any one of the CDC circuits 140 or 150 in the second set of footprint compatible CDC circuits of the cell library 100 can be replaced with another footprint compatible CDC circuit, but which has a different delay characteristic to meet certain timing constraints without having to repeat design steps such as placement, routing, etc. The footprint of the CDC circuits 110, 120 and 130 in the first set of footprint compatible CDC circuits is different than the footprint of the CDC circuits 140 and 150 in the second set of footprint compatible CDC circuits, such CDC circuits 110, 120 and 130 in the first set cannot be used to replace CDC circuits 140 and 150 in the second set, and vice versa.

Figure 2A:
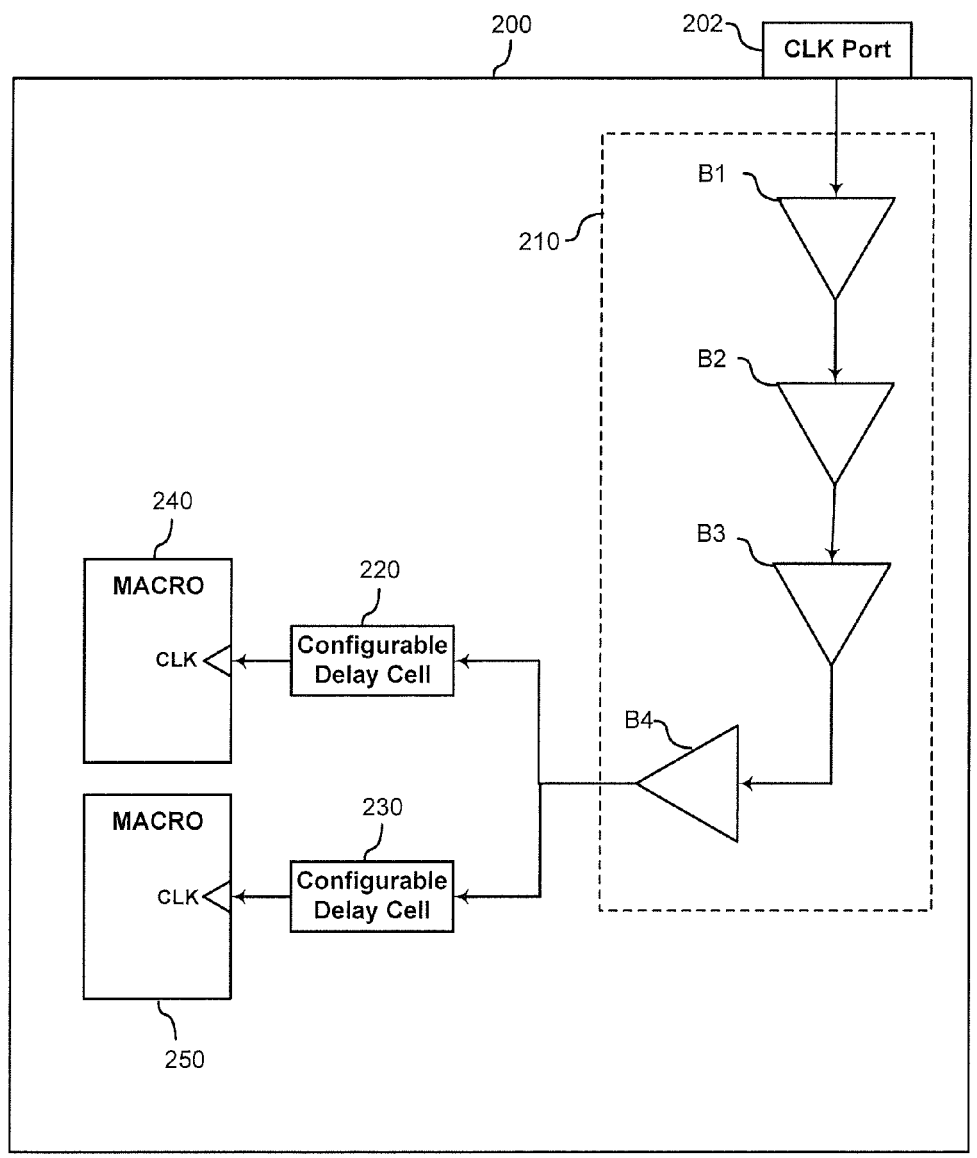
FIG. 2A shows an embodiment of an integrated circuit design with CDC circuits connected to clock input ports of macro cells.

As noted above, in various embodiments, a CDC circuit can be used to add delay in clock paths or data paths of an IC design. For example, FIG. 2A shows an embodiment of an integrated circuit design with CDC circuits connected to clock input ports of macro cells. FIG. 2A shows a circuit block 200 comprising a clock (CLK) port 202, a clock signal distribution network 210, a first CDC circuit 220, a second CDC circuit 230, a first macro cell 240 and a second macro cell 250. The clock signal distribution network 210 comprises a chain of serially connected buffers B1, B2, B3, and B4. The clock port 202 is connected to an input of the clock signal distribution network 210. An output of the clock signal distribution network 210 is commonly connected to an input of the first CDC circuit 220 and an input of the second CDC circuit 230. An output of the first CDC circuit 220 is connected to a clock input port (clock pin) of the first macro cell 240 and an output of the second CDC circuit 230 is connected to a clock input port (clock pin) of the second macro cell 250. The first and second macro cells 240 and 250 may be any type of circuit such as a logic circuit, memory block, bank of flip-flops, etc.

The clock signal distribution network 210, which may be designed during a clock synthesis process, is provided to distribute a clock signal from the clock port 202 to the clock input pins of the first and second macro cells 240 and 250, with a desired amount of skew and delay as provided by the buffers B1, B2, B3, and B4, as well as the first and second CDC circuits 220 and 230. During an IC design, the delay to the clock input port of the first macro cell 240 can be adjusted as needed to meet timing constraints by replacing the first CDC circuit 220 with another footprint compatible CDC circuit having a different delay characteristic. Likewise, the delay to the clock input port of the second macro cell 250 can be adjusted as needed to meet timing constraints by replacing the second CDC circuit 230 with another footprint compatible CDC circuit having a different delay characteristic.

In accordance with embodiments of the invention, when one of the first or second CDC circuits 220 and 230 are replaced with another footprint compatible CDC circuit during the IC design, there is no need to change the clock signal distribution network 210. Indeed, even though the macro cells 240 and 250 share the same clock signal distribution network 210, changing the CDC circuit connected to one macro cell does not affect the clock latency to the clock input port of the other macro cell. In other words, the clock latency to the first macro cell 240 can be changed without affecting the clock latency to the second macro cell 250, and vice versa.

Figure 2B:
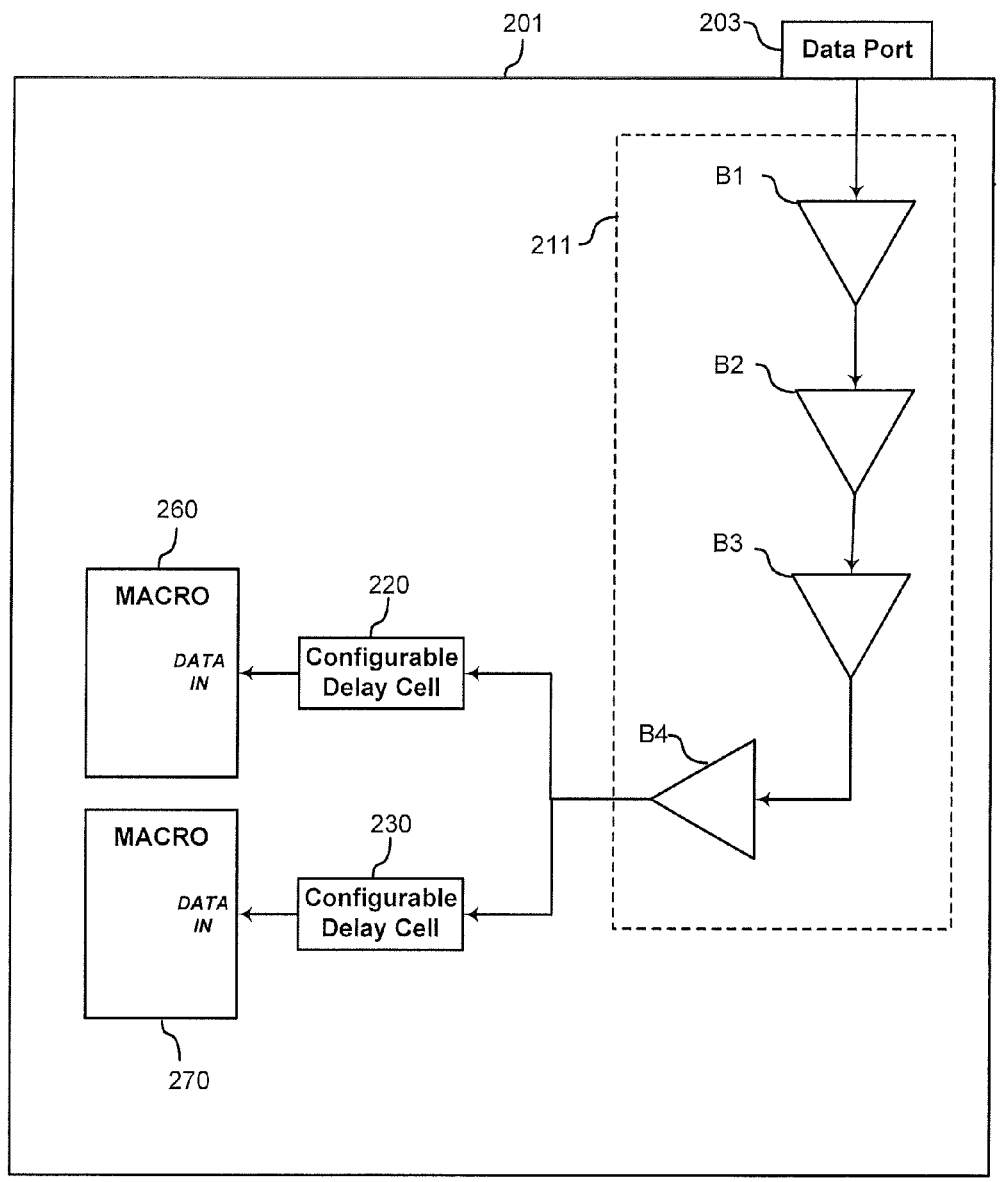
FIG. 2B shows an embodiment of an integrated circuit design with CDC circuits connected to data input ports of macro cells.

The same concepts are applicable to IC designs using CDC circuits to change the latency to data input pins of macro cells. For example, FIG. 2B shows an embodiment of an integrated circuit design with CDC circuits connected to data input ports of macro cells. FIG. 2B shows a circuit block 201 comprising a data port 203, a data signal distribution network 211, a first CDC circuit 220, a second CDC circuit 230, a first macro cell 260 and a second macro cell 270. The data signal distribution network 211 comprises a chain of serially connected buffers B1, B2, B3, and B4. The data port 203 is connected to an input of the data signal distribution network 211. An output of the data signal distribution network 211 is commonly connected to an input of the first CDC circuit 220 and an input of the second CDC circuit 230. An output of the first CDC circuit 220 is connected to a data input port of the first macro cell 260 and an output of the second CDC circuit 230 is connected to a data input port of the second macro cell 270. The first and second macro cells 260 and 270 may be any type of circuit such as a logic circuit, memory block, bank of flip-flops, etc.

During an IC design, the delay/skew of a data signal at the data input port of the first macro cell 260 can be adjusted as needed to meet timing constraints by replacing the first CDC circuit 220 with another footprint compatible CDC circuit having a different delay characteristic. Likewise, the delay/skew of a data signal at the data input port of the second macro cell 270 can be adjusted as needed to meet timing constraints by replacing the second CDC circuit 230 with another footprint compatible CDC circuit having a different delay characteristic.

Figure 3:
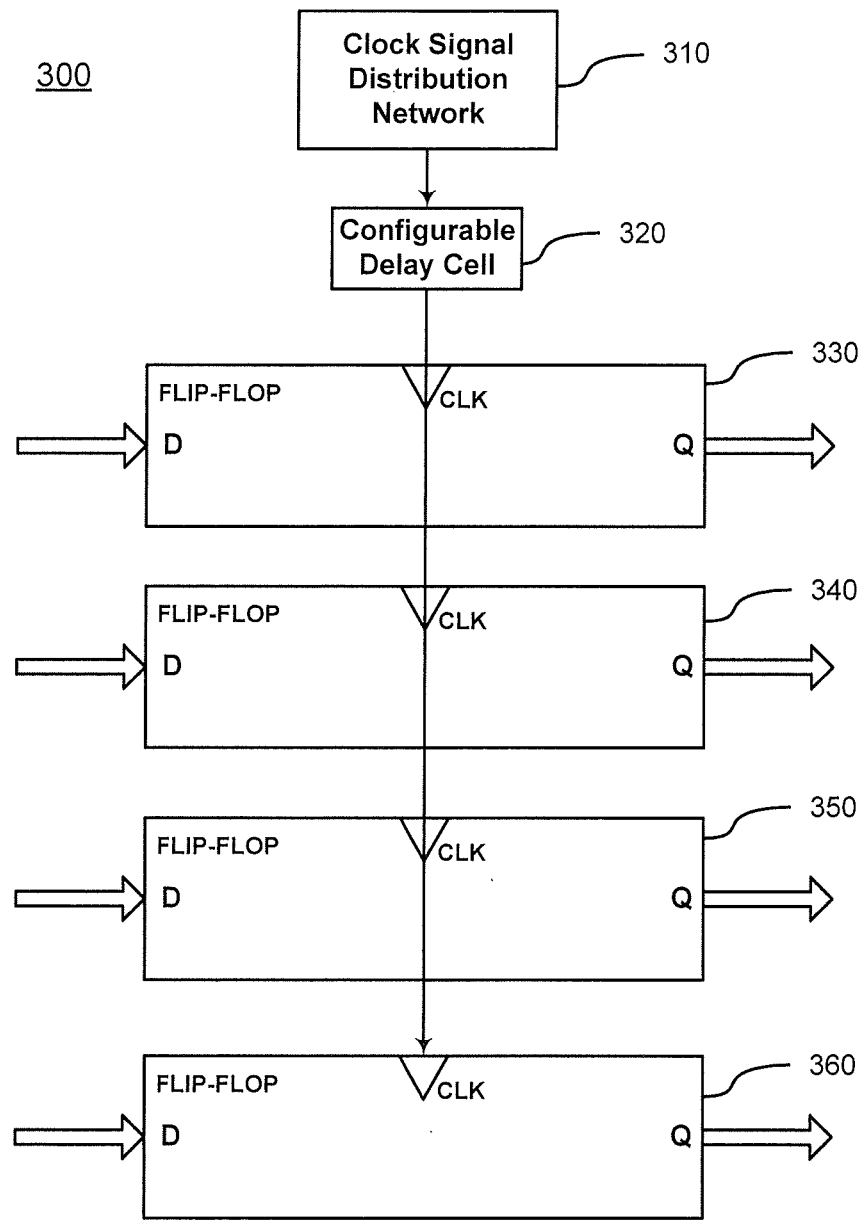
FIG. 3 shows an embodiment of an integrated circuit design with a CDC circuit connected to clock input ports of a bank of flip-flops.

FIG. 3 shows an embodiment of an integrated circuit design with a CDC circuit commonly connected to clock input ports of a bank of flip-flops. FIG. 3 shows a block diagram of an integrated circuit 300 comprising a clock signal distribution network 310, a CDC circuit 320, and a bank of flip-flops comprising a plurality of flip-flops 330, 340, 350 and 360. The clock signal distribution network 310 is connected to an input of the CDC circuit 320 and an output of the CDC circuit 320 is commonly connected to the clock input ports of each flip-flop 330, 340, 350, and 360. In the embodiment of FIG. 3, each flip-flop 330, 340, 350 and 360 shares a common clock source wherein the clock delay can be adjusted, as needed, during the IC design by replacing the CDC circuit 320 with another footprint compatible CDC circuit from a cell library, which has a different delay characteristic that is selected to meet one or more timing constraints for the IC design.

In a conventional IC design that does not make use of CDC circuits according to embodiments of the invention, a change in the clock delay input to a given macro cell would require a change in the clock signal distribution network driving the clock input port of the given macro cell. For instance, in the embodiment of FIG. 2A, for example, in the absence of the CDC circuits 220 and 230, a change in latency of a clock signal at the clock input port of the first macro cell 240 would require removal of one or more existing buffers B1~B4 or the addition of more buffers in the clock signal distribution network 210 driving the macro cells 240 and 250. While the required change in clock latency would be obtained for the first macro cell 240, changing the clock signal distribution network 210 could affect the clock latency to the second macro cell 250 in a way that would require further changes to the clock signal distribution network 210. However, the use of the CDC circuits 220 and 230 obviates this problematic issue with conventional IC design processes.

It is to be understood that although FIGS. 2A, 2B and 3 show one CDC circuit connected between the input port (data or clock input port) of a macro cell and the output of a clock signal or data signal distribution network (generally referred to herein as "signal distribution network"), any number of CDC circuits can be coupled in series between the macro cell inputs and the output of a signal distribution network. For instance, in FIGS. 2A and 2B, the CDC circuits 220 or 230 can be implemented using a chain of two or more CDC circuits, to achieve a total overall delay, which is needed for a given design. The CDC circuits in a given chain of CDC circuits may or may not be footprint compatible CDC circuits. For instance, a chain of CDC circuits can include two different, non-footprint compatible CDC circuits, such as CDC circuits 110 and 140 shown in FIG. 1, to provide a desired delay. During the design phase, any one of the CDC circuits in a given chain of CDC circuits can be replaced with another footprint compatible CDC circuit having a different delay characteristic.

Figure 4:
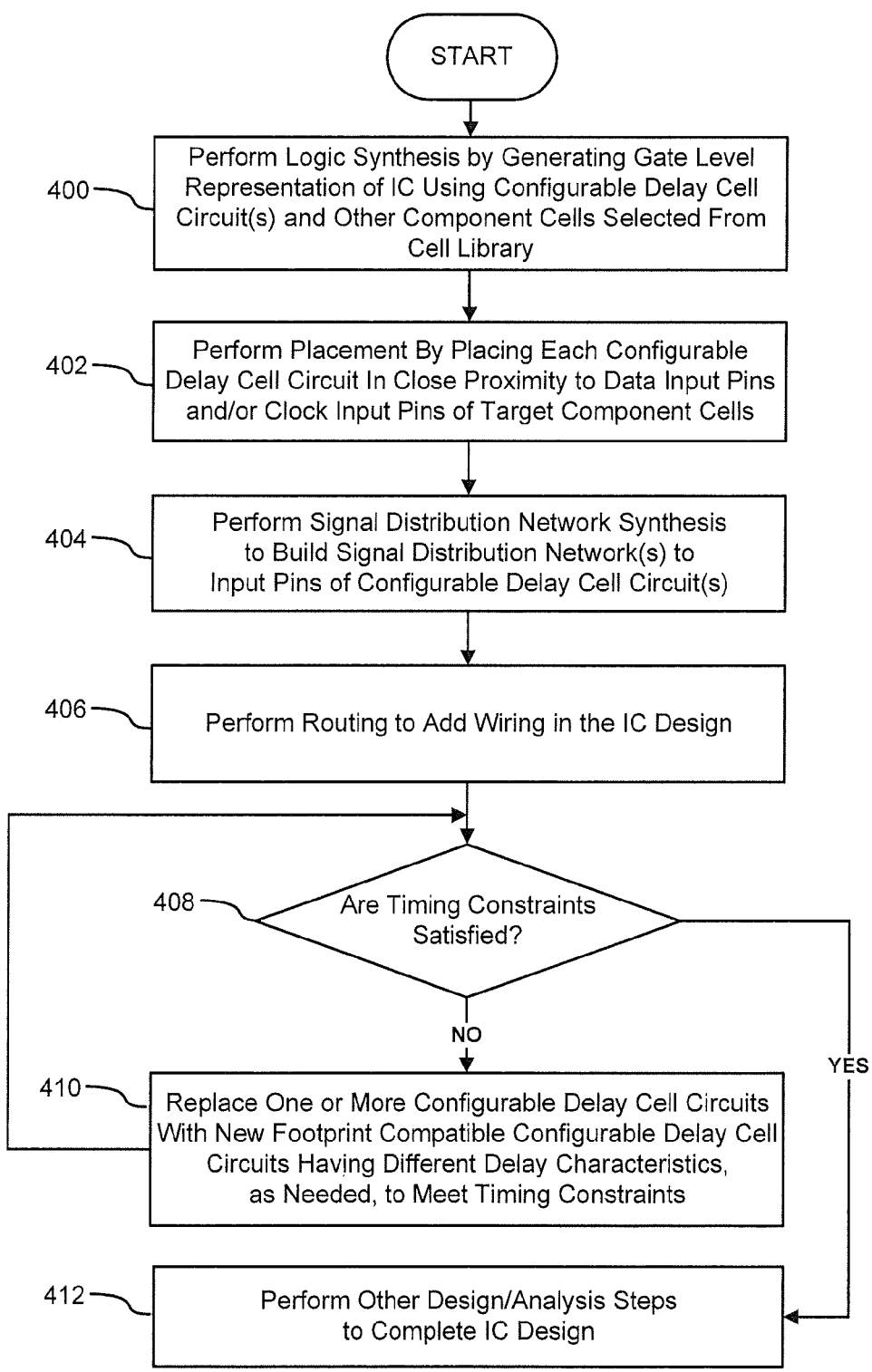
FIG. 4 is flowchart of a method for designing an integrated circuit using CDC circuits according to an embodiment of the invention.

FIG. 4 is flowchart of a method for designing an integrated circuit using configurable delay cell circuits according to an embodiment of the invention. More specifically, FIG. 4 illustrates a method for designing an integrated circuit using CDC circuits to expedite timing closure of the IC design by eliminating the need repeat the placement, clock synthesis, and routing processes when a CDC circuit is replaced with other footprint compatible CDC circuit to meet I given timing constraint. Referring to FIG. 4, a first step involves performing a logic synthesis process to generate a gate level representation (net list) of a given IC design using various library components (or "component cells") such as macro cells (e.g., adders, multiplexers, banks of flip-flops, memory, etc.), logic gates (e.g., AND gates, OR gates, etc.), other logic circuits (e.g., flip-flops), and CDC circuits, which are selected from a given cell library (step 400). In this process, an RTL (or other abstract form of desired circuit behavior) can be mapped into a gate-level net list in a target technology in which the chip will be designed using the selected library components. In accordance with embodiments of the invention, one or more CDC circuits may be used in the initial stage of logic synthesis by connecting CDC circuits to clock and/or data input pins of macro cells, flip-flops, logic circuits, etc., that are part of the IC design. At the logic synthesis stage, CDC cells having average delay characteristics may be initially selected.

A next step involves performing a placement process wherein the various library components in the net list are assigned to non-overlapping locations on the IC die area. In a placement process, each CDC circuit is placed in close proximity to the data input pins and clock input pins of the target component cells, e.g., macro cells (step 402). For example, as shown in FIG. 2A, the outputs of the CDC circuits 220 and 230 are placed in close proximity to the clock input ports of the macro cells 240 and 250, respectively.

A next step involves performing a signal distribution network synthesis process to build one or more signal distribution networks that are connected to the inputs of one or more CDC circuits in the IC design (step 404). In this process, a signal distribution network, such as a clock distribution network or data signal distribution network, is built up to the input pins of CDC circuits in the IC design. In one embodiment, the signal distribution network process involves constructing and inserting a balanced buffered clock trees into the physical design, which distributes a clock signal from a common clock source to one or more target component cells (e.g., flip-flop) at one or more destination points, which operate using the clock signal. Ideally, a clock signal will arrive to all target elements at the same time. Due to variations in buffering, loading, and interconnect lengths, however, the clock signal is skewed. A clock signal or data signal distribution network insertion tool according to an embodiment of the invention evaluates the loading and positioning of all clock and/or data related signals and places buffers in the appropriate points of the die to minimize skew to acceptable levels. In an embodiment, during the signal distribution network synthesis process, a delay balancing process (for data and/or clock signals) will be performed on the IC design up to the input pins of the initially selected CDC circuits, while taking the delay characteristics of the initially selected CDC circuits into consideration.

After the signal distribution network synthesis stage is complete, a next step in the method of FIG. 4 involves performing a routing process to add wiring to the IC design (step 406). A routing process adds the wires that are needed to properly connect the placed component cells while obeying all design rules for the IC design. Techniques for adding wiring to IC designs are well known to those of ordinary skill in the art.

A next step of the illustrative process is to perform a timing analysis to determine if timing constraints for the IC design are satisfied (step 408). For example, timing analysis is performed on the current IC design to determine if clock latencies to macro cells or other circuit components are acceptable or not, or whether latencies in data paths are acceptable or not, etc. If it is determined that a given timing constraint for the IC design is not satisfied (negative determination in step 408), then one or more existing CDC circuits in the IC design can be replaced with new footprint compatible CDC circuits with different delay characteristics that are selected to meet the given timing constraint(s) (step 410).

By way of example, assume that the CDC circuit 220 in FIG. 2A is implemented using the CDC circuit 120 shown in FIG. 1. Assume further that during a timing analysis of the circuit 200 of FIG. 2A, it is determined that a "setup" time to the macro cell 240 is failing, thereby requiring an increase in the delay of a clock signal to the clock input pin of the macro cell 240. In this example, the CDC circuit 120 (with total delay=D3+D4+D5) could be replaced with another CDC circuit in the cell library 100 which is footprint compatible, but which has a greater delay. For instance, the footprint compatible CDC circuit 110 (with total delay=D2+D3+D4+D5) could be used to replace the CDC circuit 120, where the sum of D2+D3+D4+D5 is greater than the sum of D3+D4+D5. On the other hand, if the delay of the CDC circuit 120 (total delay=D3+D4+D5) is more than enough to meet the setup time for the macro cell 240, but it is determined that the delay is causing issues in hold closure, the CDC circuit 120 can be replaced with another CDC circuit in the cell library 100 which is footprint compatible, but which has a smaller delay. For instance, the footprint compatible CDC 130 (with total delay=D4+D5) could be used to replace the CDC 120, where the sum of D4+D5 is less than the sum of D3+D4+D5.

Referring again to FIG. 4, after one or more existing CDC circuits are replaced with new footprint compatible CDC circuits having desired delay characteristics, a timing analysis is repeated with the newly inserted CDC circuit(s) to determine if the timing constraint(s) is/are satisfied (repeat step 408). The timing analysis (step 408) is repeated without having to repeat various steps such as the placement, signal distribution network synthesis, and routing process steps (402, 404, or 406). An iterative loop of steps 408 and 410 can be repeated any number of times until all timing constraints are satisfied, and timing closure is met (affirmative result in step 408). Thereafter, any remaining design/analysis steps can be performed, which are commonly employed to complete an IC design (step 412). In this regard, timing closes without multiple iterations of placement, signal distribution network synthesis, and routing.

Figure 5:
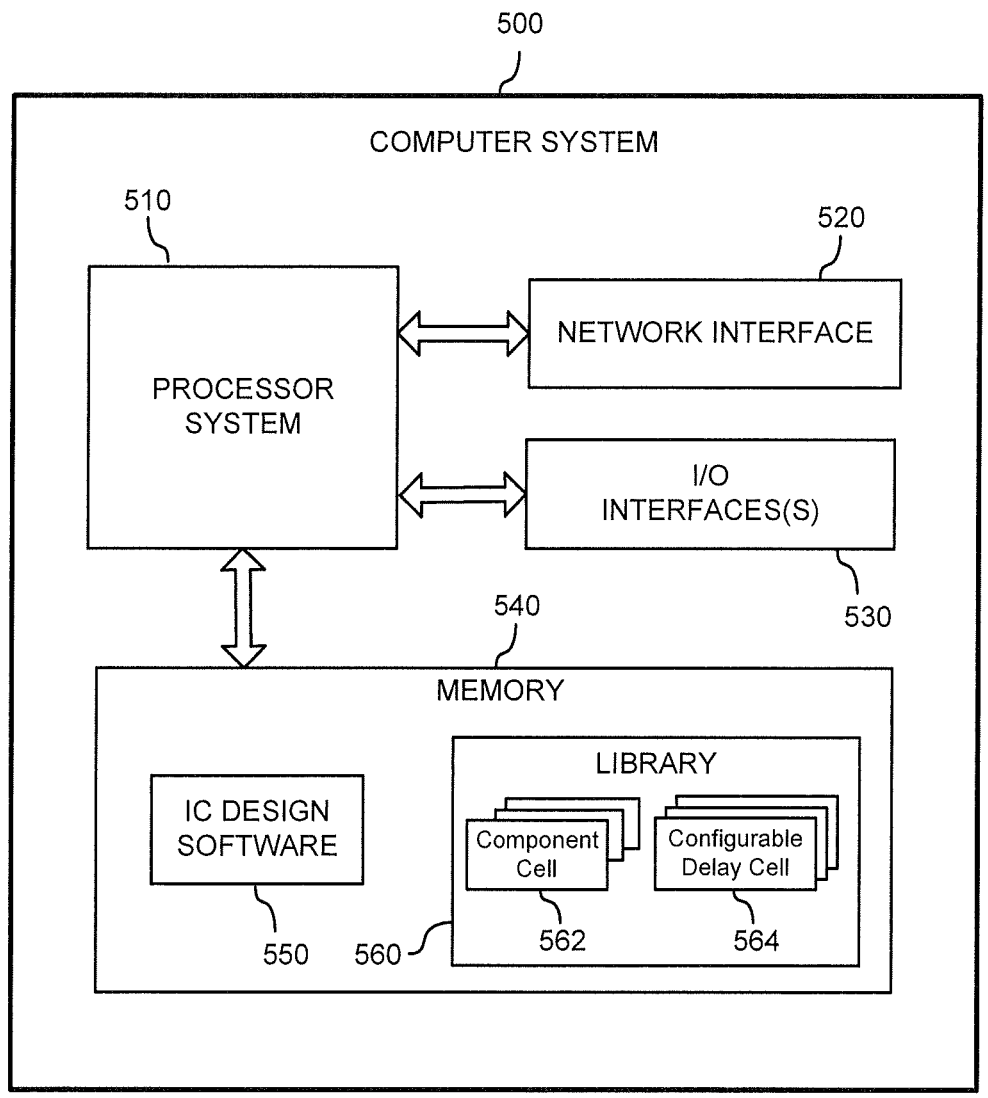
FIG. 5 is a high-level block diagram of a computing system for designing an integrated circuit chip according to an embodiment of the invention.

It is to be understood that in some embodiments, the various IC design steps described herein, such as those steps shown and discussed above with reference to FIG. 4, may be embodied in program code (software programs) which is executable by a computing system to implement the various IC design steps. For instance, FIG. 5 is a high-level block diagram of a computing system 500 for designing an integrated circuit chip according to an embodiment of the invention. In general, the computing system 500 comprises a processor system 510, a network interface 520, one or more input/output (I/O) interfaces 530, and a memory system 540 which stores, for example, IC design software 550 and a cell library 560 comprising various component cells 562 (such as macro cells) and CDC circuits 564.

The network interface 520 is coupled to the processor system 510 to provide an interface that allows the processor system 510 to communicate with other systems and devices over one or more networks. The network interface 520 may comprise one or more transceivers. The I/O interface(s) 530 is/are coupled to the processor system 510 to provide an interface that allows the processor system 510 to communicate with one or more external devices such as a keyboard, a pointing device, a display, etc. The processor system 510 is coupled to the memory 540 to execute program instructions (e.g., IC design software 550) and access associated data (e.g., library components 562 and 564) for designing an IC chip, using techniques as discussed herein.

For instance, the IC design software 550 may include one or more software programs for implementing an RTL design phase to convert a user specification of chip function into an RTL description, and various phase of a physical design phase including, but not limited to, logic synthesis, placement, signal distribution network synthesis, routing and timing analysis, using the various components 562 and 564 of the cell library 560 stored in memory 540. The memory 540 is an example of what is more generally referred to herein as a computer readable storage medium or other type of computer program product having computer program code tangibly embodied thereon. The memory 540 may comprise, for example, electronic memory such as RAM or ROM, magnetic memory, optical memory, or other types of storage devices in any combination. The processor system 510 may comprise a microprocessor, CPU, ASIC, FPGA or other type of processing device, as well as portions or combinations of such devices.

Furthermore, embodiments of the invention may be implemented in the form of integrated circuits such as shown in FIGS. 2A, 2B and 3. In an integrated circuit implementation, identical dies are typically formed in a repeated pattern on a surface of a semiconductor wafer. Each die includes one or more circuit cores and circuitry as described herein, and may include other structures or circuits. The individual die are cut or diced from the wafer, and then each die is packaged as an integrated circuit. One skilled in the art would know how to dice wafers and package die to produce integrated circuits. Integrated circuits so manufactured are considered embodiments of this invention.

Although embodiments of the invention have been described herein with reference to the accompanying drawings, it is to be understood that embodiments of the invention are not limited to the described embodiments, and that various changes and modifications may be made by one skilled in the art resulting in other embodiments of the invention within the scope of the following claims.

What is claimed is:

1. A method of designing an integrated circuit, comprising:
    performing a logical synthesis process to generate a gate level representation of an integrated circuit design using one or more component cells selected from a cell library, wherein the selected component cells included in the gate level representation of the integrated circuit design include macro cells and configurable delay cell circuits;
    performing a placement process to place a configurable delay cell circuit in proximity to a macro cell in the integrated circuit design;
    performing a signal distribution network synthesis process to build a signal distribution network that is connected to an input of the configurable delay cell circuit in the integrated circuit design;
    performing a routing process to add wiring to the integrated circuit design;
    performing a timing analysis to determine if timing constraints for the integrated circuit design are satisfied;
    when a given timing constraint is not satisfied, replacing the configurable delay cell circuit in the integrated circuit design with a new configurable delay cell circuit which has a same footprint as the replaced configurable delay cell circuit, but which has a different delay characteristic that is selected to meet the given timing constraint; and
    repeating the timing analysis with the new configurable delay cell circuit, wherein the timing analysis is repeated without having to repeat the placement, signal distribution network synthesis, and routing processes,
    wherein the logical synthesis, placement, signal distribution network synthesis, routing and timing analysis processes are performed using a computer.

2. The method of claim 1, wherein performing a placement process comprises placing an output pin of the configurable delay cell circuit in proximity to an input pin of the macro cell.

3. The method of claim 2, wherein the signal distribution network comprises a clock signal distribution network, and wherein the input pin of the macro cell is a clock input pin.

4. The method of claim 2, wherein the signal distribution network comprises a data signal distribution network, and wherein the input pin of the macro cell is a data input pin.

5. The method of claim 1, wherein performing a signal distribution network synthesis process comprises considering a delay characteristic of the configurable delay cell circuit that is to be connected to the output of the signal distribution network.

6. The method of claim 1, wherein performing a placement process comprises placing two or more serially connected configurable delay cell circuits in proximity to a macro cell in the integrated circuit design.

7. The method of claim 1, wherein the cell library comprises one or more sets of configurable delay cell circuits, wherein each configurable delay cell circuit in a given set of configurable delay cell circuits has a same footprint and a different delay characteristic.

8. The method of claim 7, wherein the footprints of configurable delay cell circuits of different sets of configurable delay cell circuits are different.

9. The method of claim 7, wherein each configurable delay cell circuit in a given set of configurable delay cell circuits comprises a chain of buffers, wherein a number of buffers in the chain of buffers is the same for each configurable delay cell circuit in the given set.

10. The method of claim 9, wherein a total delay for a given configurable delay cell circuit is based on a number of buffers in the chain of buffers, which are serially connected between an input port and an output port of the given configurable delay cell circuit.

11. A computer readable storage medium comprising a program of instructions which, when executed by a computer, perform the method steps of claim 1 for designing an integrated circuit.

12. A computing system, comprising:
a memory to store program instructions for designing an integrated circuit and to store a cell library comprising a plurality of component cells, wherein the component cells include macro cells and configurable delay cell circuits;
a processor system coupled to the memory, wherein the processor system is operative to execute the stored program instructions to perform a method for designing an integrated circuit, the method comprising:
performing a logical synthesis process to generate a gate level representation of an integrated circuit design using one or more component cells selected from a cell library, wherein the selected component cells included in the gate level representation of the integrated circuit design include macro cells and configurable delay cell circuits,
performing a placement process to place a configurable delay cell circuit in proximity to a macro cell in the integrated circuit design;
performing a signal distribution network synthesis process to build a signal distribution network that is connected to an input of the configurable delay cell circuit in the integrated circuit design;
performing a routing process to add wiring to the integrated circuit design;
performing a timing analysis to determine if timing constraints for the IC design are satisfied;
when a given timing constraint is not satisfied, replacing the configurable delay cell circuit in the IC design with a new configurable delay cell circuit which has a same footprint as the replaced configurable delay cell circuit, but which has a different delay characteristic that is selected to meet the given timing constraint; and
repeating the timing analysis with the new configurable delay cell circuit, wherein the timing analysis is repeated without having to repeat the placement, signal distribution network synthesis, and routing processes.

13. The computing system of claim 12, wherein in performing a placement process, the processor system is operative to place an output pin of the configurable delay cell circuit in proximity to an input pin of the macro cell.

14. The computing system of claim 13, wherein the signal distribution network comprises a clock signal distribution network, and wherein the input pin of the macro cell is a clock input pin.

15. The computing system of claim 13, wherein the signal distribution network comprises a data signal distribution network, and wherein the input pin of the macro cell is a data input pin.

16. The computing system of claim 12, wherein in performing a signal distribution network synthesis process, the processor system is operative to consider a delay characteristic of the configurable delay cell circuit that is to be connected to the output of the signal distribution network.

17. The computing system of claim 12, wherein in performing a placement process, the processor system is operative to place two or more serially connected configurable delay cell circuits in proximity to a macro cell in the IC design.

18. The computing system of claim 12, wherein the cell library comprises one or more sets of configurable delay cell circuits, wherein each configurable delay cell circuit in a given set of configurable delay cell circuits has a same footprint and a different delay characteristic.

19. The computing system of claim 18, wherein the footprints of configurable delay cell circuits of different sets of configurable delay cell circuits are different.

20. The computing system of claim 18, wherein each configurable delay cell circuit in a given set of configurable delay cell circuits comprises a chain of buffers, wherein a number of buffers in the chain of buffers is the same for each configurable delay cell circuit in the given set.

21. The computing system of claim 20, wherein a total delay for a given configurable delay cell circuit is based on a number of buffers in the chain of buffers, which are serially connected between an input port and an output port of the given configurable delay cell circuit.

* * * * *